United States Patent [19]

Yokoyama

[11] Patent Number: 5,012,365

[45] Date of Patent: Apr. 30, 1991

[54] MAGNETIC DISC FILTER APPARATUS

[75] Inventor: Tadashi Yokoyama, Hyogo, Japan

[73] Assignee: Mitsubishi Denki Kabushiki Kaisha, Tokyo, Japan

[21] Appl. No.: 432,518

[22] Filed: Nov. 7, 1989

[30] Foreign Application Priority Data

Nov. 9, 1988 [JP] Japan .................. 63-284448

[51] Int. Cl.⁵ ............................................. G11B 33/14
[52] U.S. Cl. ................................ 360/97.03; 360/98.01
[58] Field of Search ................ 360/97.2, 97.3, 98.1; 55/385.6

[56] References Cited

U.S. PATENT DOCUMENTS 4,594,626 6/1986 Frangesh ..................... 360/97.02
4,710,830 12/1987 Imai et al. ..................... 360/970.3

FOREIGN PATENT DOCUMENTS 0038781 2/1985 Japan .................. 360/97.02
0198485 9/1986 Japan .
0229593 10/1987 Japan .................. 360/97.02
0211185 9/1988 Japan .
0211186 9/1988 Japan .
0033788 2/1989 Japan .................. 360/97.02

Primary Examiner—David J. Severin
Attorney, Agent, or Firm—Wolf, Greenfield & Sacks

[57] ABSTRACT

In the magnetic disc apparatus of the present invention, an air filter for filtration has a filter element bent in a zigzag form with a pitch equal to an interval at which plural magnetic discs are separately housed in a closed casing. The bend lines of the filter element are set on planes where the centers in the thickness direction of the magnetic discs are positioned. The air flow is caused by rotation of the magnetic discs so as to enter the air filter, and is not liable to have stagnation thereof in front of the filter element. Static pressure of the air flow in front of the filter element is substantially uniform.

13 Claims, 4 Drawing Sheets

MAGNETIC DISC FILTER APPARATUS

BACKGROUND OF THE INVENTION

1. Field of the Invention

The present invention relates to a magnetic disc apparatus which performs recording/regenerating of information by making use of a magnetic means while a magnetic disc is being rotated in a closed casing, and more particularly, to filtering of air in the closed casing.

2. Description of Related Art

FIG. 1 is a perspective view showing the principal part of a conventional magnetic disc apparatus such as similar to the apparatus disclosed in Japanese Patent Application Laid-Open No. 61-198485 (1986). In FIG. 1, reference number 1 designates a magnetic disc for storing information recorded by a magnetic means, and a plurality of which are separated by predetermined spaces in an array fixed to a rotatory shaft 2 of a spindle motor (not shown). A reference number 3 designates an air filter which receives air flow emanating along a recording face of the magnetic disc 1 by rotation thereof so as to filter air. The air filter 3 is provided with both a filter element 3a and a filter case 3b in which the filter element 3a is housed.

The conventional magnetic disc apparatus has been of such constitution that both the plural magnetic discs 1 fixed to the rotatory shaft 2 and the air filter 3 are housed in a closed casing (not shown). In the apparatus the magnetic disc 1 fixed to the rotatory shaft 2 is rotated by energizing the spindle motor, and recording/regenerating of information is carried out by means of a magnetic head (not shown) positioned close to the recording face of the magnetic disc 1. Since the magnetic disc 1 is rotated at high speed, air flow along the recording face thereof makes a magnetic head float slightly above the recording face, whereby a narrow gap between the magnetic head and the recording face is brought about. If any dust rising from bearings of the spindle motor, for example, comes into the narrow gap, the recording face of the magnetic disc 1 or the magnetic head gets damaged. Therefore, dust is adapted to be collected in such a way that the air flow caused by rotation of the magnetic disc 1 is utilized in order to filter air inside the closed casing.

When the magnetic disc 1 is rotated in the direction of the full-line arrow, because of the viscosity of air, there is brought about air flow along the recording face of the magnetic disc 1 in the direction of the broken-line arrow, and one portion of which flows into the air filter 3. Since the filter element 3a of the air filter 3 is an obstacle to the air flow, the air flow has stagnation therein, and, as a result, dynamic pressure thereof is changed to static pressure, whose change brings about a pressure differential in the front and rear of the filter element 3a. By this pressure differential, air is filtered in the filter element 3a, and all dust can be collected. In order to improve the filtering function of the filter element 3a, there is a need to widen the ventilation area of the filter element 3a. In order to meet the need, the filter element 3a, which is bent in a zigzag form, is housed in the filter case 3b. As shown in FIG. 1, the air filter 3 is provided in the vicinity of the outer periphery of the magnetic disc 1 so that the recording face of the magnetic disc 1 is at right angles to the bend lines of the filter element 3a.

In the conventional magnetic disc apparatus as described above, the air flow along the recording face of the magnetic disc 1 by rotation of the magnetic disc 1 flows into the air filter 3. The air flow gets confused because the air flow collides with convex portions of the filter element 3a as seen from the air in flow side of the filter element 3a. As a result, there is a disadvantage in that the static pressure in front of the filter element 3a becomes too uneven to carry out enough filtering.

SUMMARY OF THE INVENTION

The foregoing disadvantage is overcome in accordance with the present invention. The magnetic disc apparatus of the present invention is provided with a filter element bent in a zigzag form with a pitch equal to a pitch of plural magnetic discs. The bend line of the zigzag form of the filter element is in corresponding alignment set on a plane where a center in the thickness direction of one of the magnetic discs is positioned. Thereby, air flow which has entered the air filter is not liable to be confused in front of the filter element.

In addition, there may be disposed between two adjoining magnetic discs a guide plate for guiding air flow to the air filter. Further, the zigzag construction of the filter element may be formed to be an acute angle or an arc.

It is an object of the present invention to provide a magnetic disc apparatus capable of performing enough filtering function, making the static pressure of air flow in front of the filter element substantially uniform.

It is another object of the present invention to provide a magnetic disc apparatus capable of more effectively carrying out filtering by providing a guide plate therein.

The above and further objects and features of the invention will more fully be apparent from the following detailed description with accompanying drawings.

BRIEF DESCRIPTION OF THE DRAWINGS

FIG. 3(A) is an expanded sectional view of the embodiment of FIG. 3 including a graphical depiction of dynamic pressure along the cross section and a schematic representation of alignment of the filter bend lines relative to the disc planes;

FIG. 5(A) is an expanded sectional view of the embodiment of FIG. 5 including a graphical profile of dynamic pressure along the cross section and a schematic representation of alignment of the filter bend lines relative to the disc planes;

DESCRIPTION OF THE PREFERRED EMBODIMENTS

Figure 1:
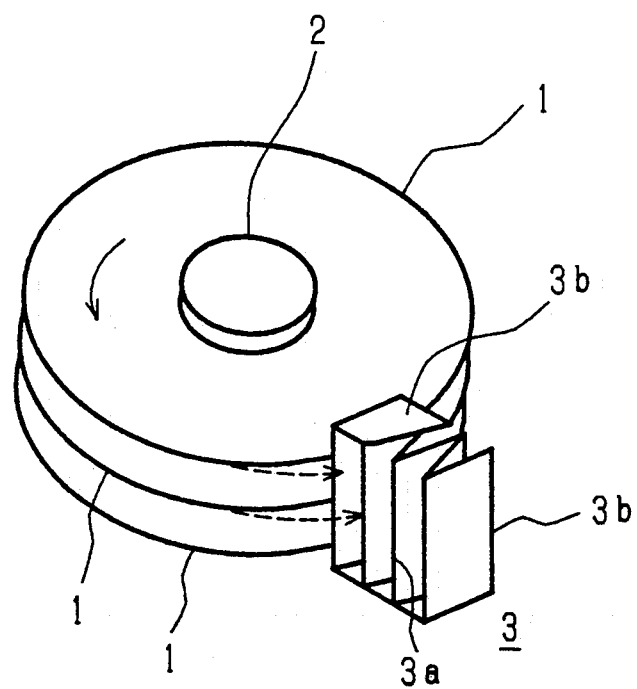
FIG. 1 is a perspective view illustrating the principle part of the conventional magnetic disc apparatus.
Figure 2:
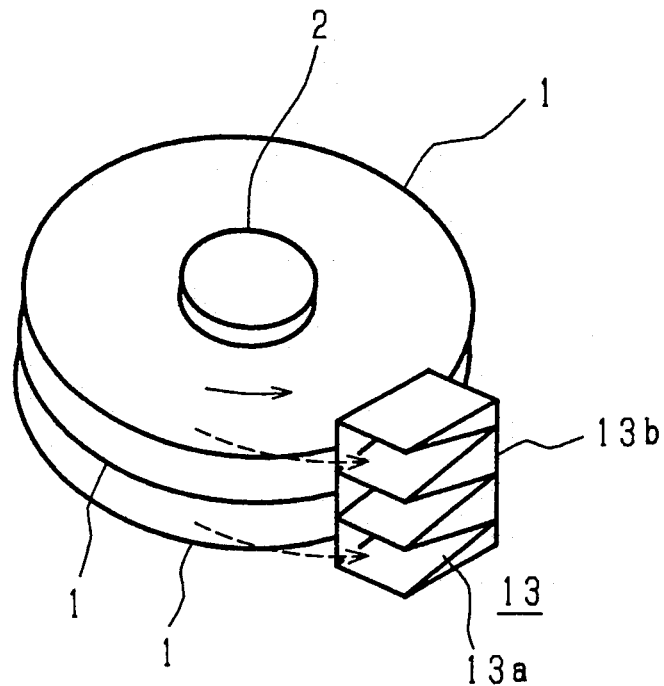
FIG. 2 is a perspective view illustrating a first embodiment of the magnetic disc apparatus in accordance with the present invention.
Figure 3:
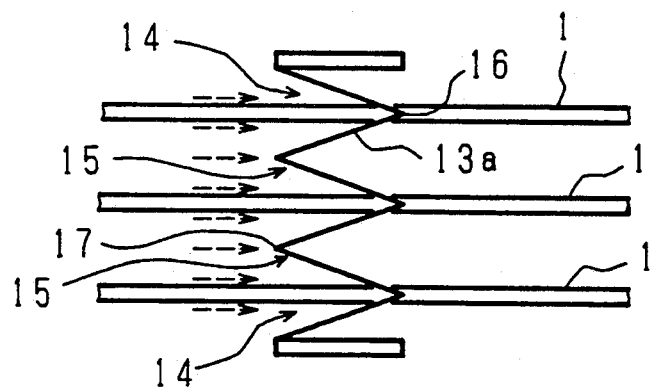
FIG. 3 is an expanded sectional view illustrating the first embodiment of the magnetic disc apparatus in accordance with the present invention.

FIG. 2 is a perspective view illustrating an embodiment of the present invention, and FIG. 3 is an expanded sectional view illustrating the relationship between the magnetic disc and the filter element in FIG. 2. In FIGS. 2 and 3, each reference numeral 1 designates a magnetic disc, so does each reference numeral 2 a rotatory shaft, both of which being identical with those in the conventional magnetic disc apparatus shown in FIG. 1. Reference number 13 designates an air filter in the present invention, which receives and filters air flow caused along the recording face of the magnetic disc 1 by rotation thereof. The air filter 13 is of such constitution that there are provided both a filter element 13a bent in a zigzag form with a pitch equal to a pitch of the magnetic discs 1 and a filter case 13b in which the filter element 13a is housed.

As in the same way as the conventional magnetic disc apparatus, the magnetic disc apparatus of the present invention is of such constitution that plural magnetic discs 1 fixed to the rotatory shaft 2 of a spindle motor (not shown) and the air filter 13 are fitted into a closed casing (not shown) by the same operation as that of the conventional apparatus, and, therefore, only differences from the conventional example will be referred to below.

The filter element 13a is bent in a zigzag form with a pitch equal to a pitch by which the magnetic discs are arranged (spaced). The zigzag form of the filter element may be considered as including continuous concave and convex portions. This is illustrated in FIG. 3 by the concave portion 14 and the convex portion 15. These concave and convex portions are those as identified from the air in flow side of the filter element 13a as illustrated by the broken arrows in FIG. 3. It is furthermore noted in FIG. 3 that each concave portion 14 of the filter element is in corresponding alignment with the plane of one of the magnetic discs 1. Note in FIG. 3 the bend line 16 of each zigzag form disposed on the plane where the center in the thickness direction of the magnetic disc 1 is positioned. The bend line 16 represents essentially the middle of the concave portion 14.

Analogously, in the embodiment of FIG. 3, the convex portion 15 and its associated intermediate bend line 17 is disposed at an intermediate point essentially in a plane mid-way between the planes of adjacent magnetic discs.

In FIG. 2, when the magnetic disc 1 is rotated in the direction of the full line arrow, because of the viscosity of air, air flow is caused along the recording face of the magnetic disc 1 in the direction of the broken-line arrow so as to enter the air filter 13. The speed of the air flow in the vicinity of the recording face of the magnetic disc 1 is greater than that of the air flow mid way between the adjoining magnetic discs 1, 1. The air flow in the vicinity of the recording face of the magnetic disc 1 with greater dynamic pressure enters the concave portion 14 (seen from the air in flow side) of the filter element 13a. On the other hand, the air flow mid-way between the adjoining magnetic discs 1, 1 with less dynamic pressure enters the convex portion 15 (seen from the air in-flow side) of the filter element 13a and collides with the filter element 13a so as to be changed to be that with static pressure. (See FIG. 3(A) for dynamic pressure profile in relation to filter element bends (with element rotated forward for clarity)). As a result, the static pressure in front of the filter element 13a is substantially uniform, and enough filtering function is obtained.

Figure 4:
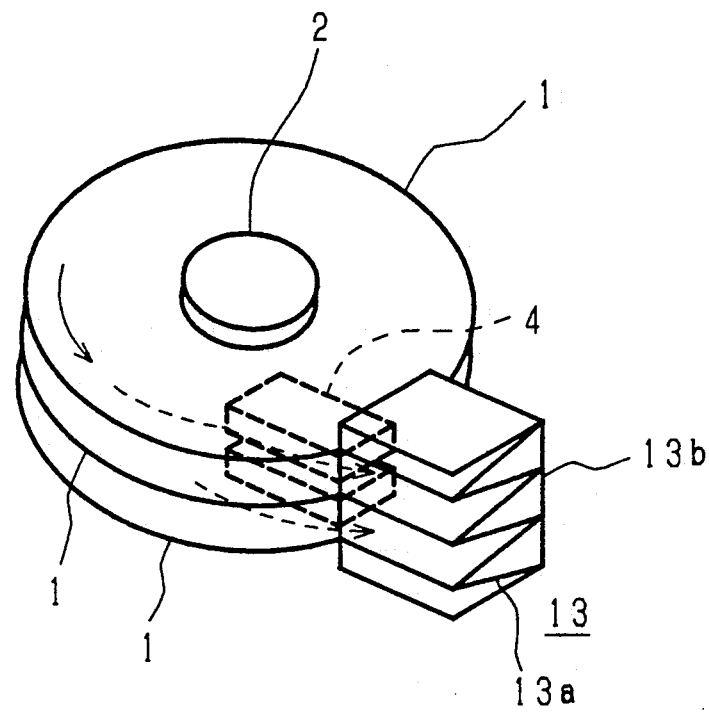
FIG. 4 is a perspective view illustrating a second embodiment of the magnetic disc apparatus in accordance with the present invention.
Figure 5:
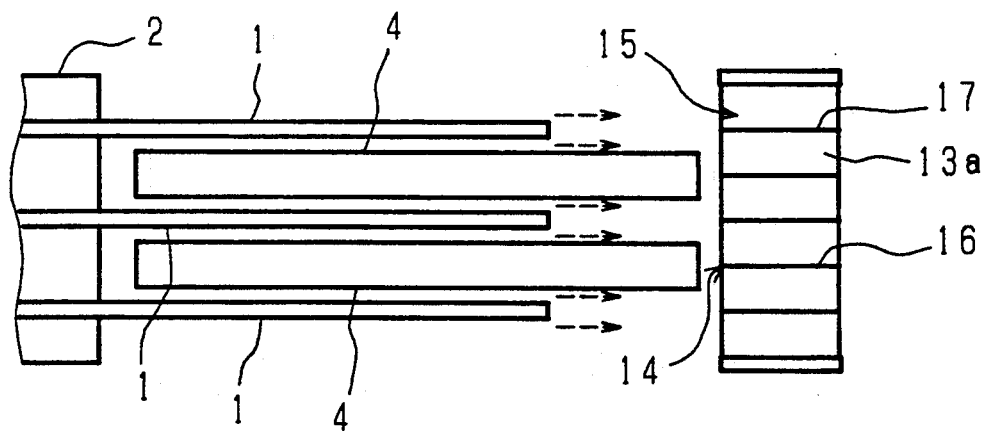
FIG. 5 is an expanded sectional view illustrating the second embodiment of the magnetic disc apparatus in accordance with the present invention.

FIG. 4 is a perspective view illustrating another embodiment of the present invention, and FIG. 5 is an expanded sectional view illustrating the relationship between the magnetic disc and the filter element in FIG. 4. In this embodiment, a guide plate 4 is provided between the adjoining magnetic discs 1, 1 so as to guide air flow caused along the recording face of the magnetic disc 1 to the air filter 13, the length of the guide plate 4 being longer than the radius of the magnetic disc 1. In FIG. 4, the filter element 13a is bent in a zigzag form with a pitch equal to a pitch of the magnetic discs 1. As with the embodiment of FIGS. 2 and 3, in this particular embodiment, the zigzag form of the filter element 13a may be considered as including continuous concave portions 14 and convex portions 15. It is noted in FIG. 5 that the bend line 17 of each zigzag form is set on a plane where the center in the thickness direction of the magnetic disc 1 is positioned. The bend line 17 represents essentially the middle of the convex portion 15. The concave portion 14 and its associated intermediate bend line 16 is disposed between adjacent magnetic discs 1.

The speed of the air flow in the tip of the guide plate 4 is greater than that of the air flow in the vicinity of the recording face of the magnetic disc 1. The air flow in the vicinity of the recording face of the magnetic disc 1 with less dynamic pressure enters the portion 15 (seen from the air in-flow side) of the filter element 13a. On the other hand, the air flow at the tip of the guide plate 4 with greater dynamic pressure enters the concave portion 14 (seen from the air in-flow side) of the filter element 13a and collides with the filter element 13a so as to be chanced to be that with static pressure. (See FIG. 5(A) for dynamic pressure profile in relation to filter element bends (with element rotated forward for clarity)). As a result, also in this embodiment, the static pressure in front of the filter element 13a is substantially uniform, and enough filtering function is obtained.

Figure 6:
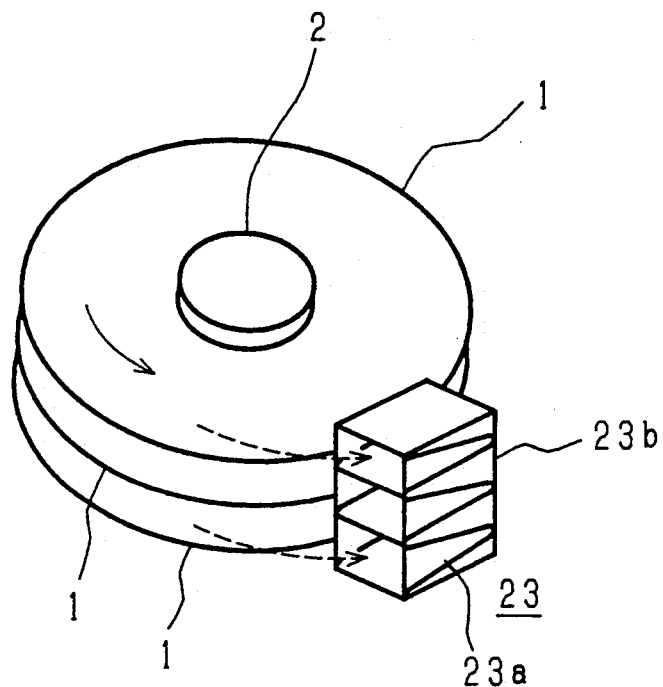
FIG. 6 is a perspective view illustrating a third embodiment of the magnetic disc apparatus in accordance with the present invention.

FIG. 6 is a perspective view illustrating another embodiment of the present invention.

Figure 7:
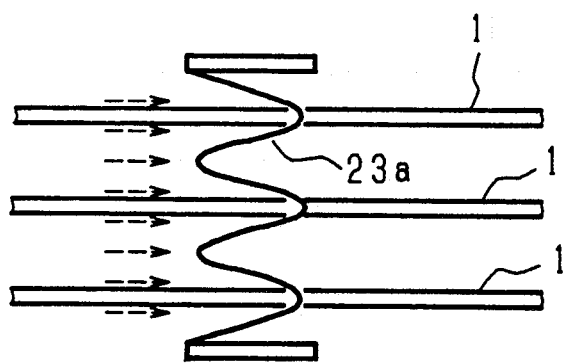
FIG. 7 is an expanded view illustrating the third embodiment of the magnetic disc apparatus in accordance with the present invention.

FIG. 7 is an expanded sectional view illustrating the relationship between the magnetic disc and the filter element in FIG. 6. In such two embodiments have been described above, the filter element 13a is bent in the zigzag form having folds with a pitch equal to a pitch of the magnetic discs 1. In this embodiment, however, bent portions of a filter element 23a, which is bent in a zigzag form with a pitch equal to a pitch of a plurality of magnetic discs 1, are adapted to be circular arcs with a predetermined radius of curvature. The concave bent portions, seen from the air in-flow side of the filter element 23a, are set on a plane where the center in the thickness direction of one of the magnetic discs 1 is positioned, as illustrated. The air filter 23 is provided with both the filter element 23a and a filter case 23b in which the filter element 23a is housed. It goes without saying that this embodiment can have the same effects as those in such two embodiments as referred to above.

As this invention may be embodied in several forms without departing from the spirit of essential characteristics thereof, the present embodiment is therefore illustrative and not restrictive since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A magnetic disc apparatus having an air filter for filtering air in a closed casing by the use of air flow caused by rotation of a plurality of magnetic discs housed therein, whose recording faces are arranged in parallel with a pitch, characterized in that said air filter has a filter element bent in a zigzag form defined by bend lines with a pitch equal to the pitch of the magnetic discs and alternating bend lines of said filter element being set on a plane where the center in a thickness direction of each of said magnetic discs is positioned.

2. A magnetic disc apparatus as set forth in claim 1, wherein each concave bend lines seen from an air in-flow side of said filter element is set on the plane where the center in the thickness direction of each of said magnetic discs is positioned.

3. A magnetic disc apparatus as set forth in claim 1, further comprising, a guide plate provided between two adjoining magnetic discs so a to guide said air flow caused by rotation of said magnetic discs to said air filter.

4. A magnetic disc apparatus as set forth in claim 3, wherein the length of said guide plate is longer than the radius of said magnetic disc, each convex bend lines seen from an air in-flow side of said filter element is set on the plane where the center in the thickness direction of each of said magnetic discs is positioned.

5. A magnetic disc apparatus having an air filter for filtering air in a closed casing by the use of air flow caused by rotation of a plurality of magnetic discs housed therein, whose recording faces are arranged in parallel with a pitch, characterized in that said air filter has a filter element bent in a zigzag form defined by bend lines with the pitch thereof being equal to the pitch of the magnetic discs, alternating bend lines of said filter element having a circular arc shape and being set on a plane where the center in a thickness direction of each of said magnetic discs is positioned.

6. A magnetic disc apparatus as set forth in claim 5, wherein each concave bent portion seen from an air in-flow side of said filter element is set on the plane where the center in the thickness direction of each of sad magnetic discs is positioned.

7. A magnetic disc apparatus having an air filter for filtering air in a closed casing by the use of air flow caused by rotation of a plurality of magnetic discs housed therein, said plurality of magnetic discs having respective recording faces arranged in a spaced parallel array with a predetermined pitch therebetween, characterized in that said air filter has a filter element bent in a zigzag form defined by bend lines forming contiguous concave and convex portions with the pitch there of being equal to the pitch of said magnetic discs, one of said bend lines of the filter element being in corresponding alignment set on a plane of each one of the magnetic discs.

8. A magnetic disc apparatus as set forth in claim 7, wherein each said concave portion and its associated bend line is in alignment with the plane of one of said plurality of magnetic discs.

9. A magnetic disc apparatus as set forth in claim 7, wherein said zigzag form includes acute angle portions.

10. A magnetic disc apparatus as set forth in claim 7, wherein said zigzag form includes circular arc portions.

11. A magnetic disc apparatus as set forth in claim 7, further comprising, a guide plate provided between two adjoining magnetic discs so as to guide said air flow caused by rotation of said magnetic discs to said air filter.

12. A magnetic disc apparatus as set forth in claim 11, wherein each said convex portion and its associated bend line is in alignment with the plane of one of said plurality of magnetic discs.

13. A magnetic disc apparatus as set forth in claim 11, wherein the length of said guide plate is longer than the radius of said magnetic disc.

* * * * *